Figure 1:
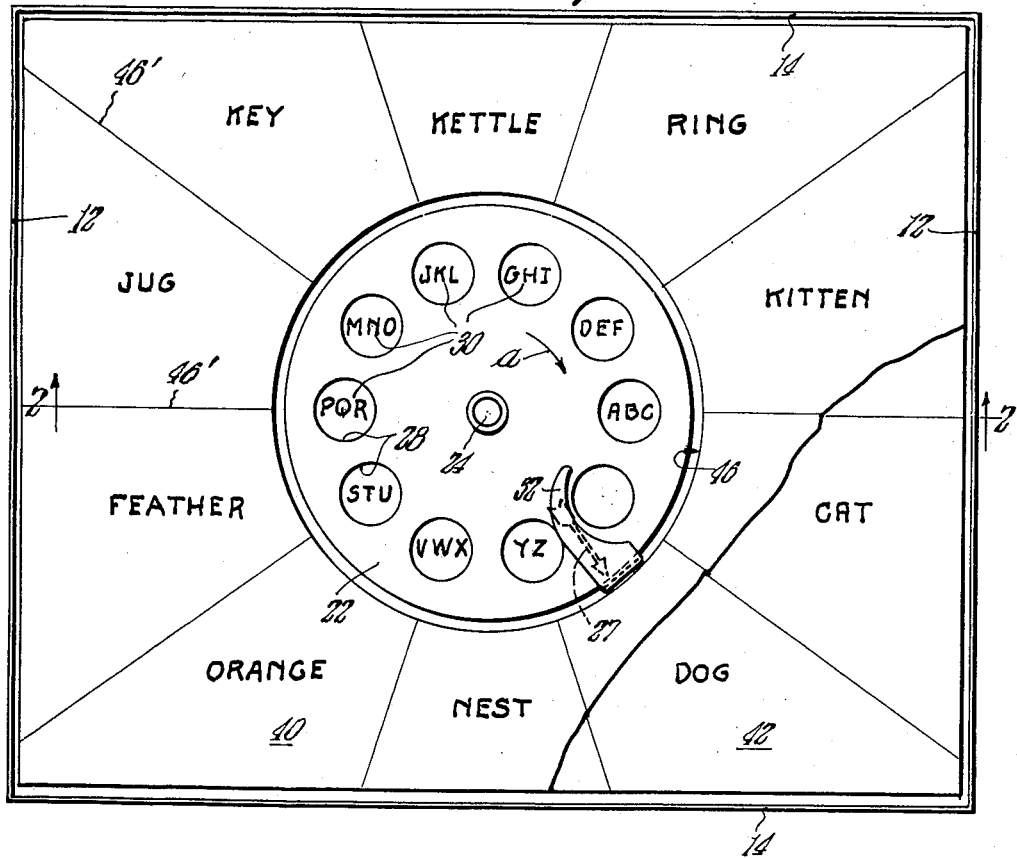

Oct. 6, 1959  T. J. McMAHON  2,907,123
EDUCATIONAL WHEEL DEVICE FOR TEACHING SPELLING
Filed Nov. 21, 1958

INVENTOR.
Thomas J. McMahon
BY Ross & Ross, Atty.

United States Patent Office 2,907,123
Patented Oct. 6, 1959

2,907,123

EDUCATIONAL WHEEL DEVICE FOR TEACHING SPELLING

Thomas J. McMahon, Glendale, Calif., assignor to Milton Bradley Company, Springfield, Mass., a corporation Application November 21, 1958, Serial No. 775,419

3 Claims. (Cl. 35—35)

This invention relates to new and useful improvements in an educational or game apparatus and is more specifically directed to a novel and valuable apparatus which is especially adapted to assist a child or other user in learning and improving his skill in reading, spelling, arithmetic and the like, and which while performing its educational function may constitute a source of recreation and entertainment.

Although the device envisions particular usefulness in training young minds, it may be employed to advantage by anyone in the elementary stages of learning our language, the device possessing the particularly advantageous feature that the individual elements thereof are combined in a coacting manner so as to spell out the name of an object illustrated which spelling operation assists very materially in thoroughly fixing an impression on the mind.

The educational subject matter may be substantially infinitely varied, but as the disclosure is by way of example and in accordance with present preference shown herein, the same is for teaching spelling. The present invention, with its substantially limitless variations as to the fields of knowledge to be studied, will therefore be described below in terms of spelling.

It will be accepted in the art of teaching that illustrations play a significant part in the forming of impressions on the mind and I have therefore included, as a key part of my invention, a plurality of picture cards, each of which carries a multiplicity of indicia or illustrations which are all positional within the range of the eye so long as the picture card is exposed, and the other components of the apparatus which are directed to the reading and spelling are employed in direct conjunction with those illustrations. Thus, after an exercise has been accomplished in one phase of learning, the result can be used in working out an exercise in another phase of learning.

According to the present invention, an educational manually rotatable disc device is provided and which is characterized by the carrying on cards, concentrically arranged relative to the disc, of a fairly large plurality of picturizations of different but related objects to be simultaneously and pictorially contrastingly displayed.

By the means thereof, any selected one of the objects may be temporarily selected as the subject of study and then in seriatim passing from one of the objects to another at will and not necessarily according to the order of their arrangement on the chart.

The invention further envisions an auxiliary means for indicating a correct answer wherefore the owner can determine for himself that he has given a correct answer.

The primary object of the invention is to provide a new and improved unit educational device which is simple in its construction, of low cost in its manufacture, and capable of being easily manipulated so as to accomplish the exercising of the mind in several phases of learning.

It is an object of the invention to provide a game device in which the rotation of an indicator or dial through a series of predetermined movements results automatically in causing an answer indicating element to come into indicating position relative to what may be termed as a correct answer in the sense that the indicating element is in an indicating position to point out what has been spelled by the motions in moving the indicator or dial through the said series of predetermined movements. That is to say, the device is of such a character that the user can accomplish the correct "answer" of a "problem" and at the completion of his effort can determine for himself whether or not he has written the answer correctly.

Another important object is the provision of a device whereby a common indicating system or mechanism may be used for a plurality of sets of charts with variation of the relative positions of the pictorial representations and the numbers of letters involved for different sets of charts whereby familiarity with the relative position of answers for one set of charts will not afford a key to such relative positions in another set of charts.

Another object hereof, is to provide a single apparatus which combines the educational features of reading and spelling.

Still another object hereof is to provide a novel educational device having few constructional elements and having a capacity of maximum use without showing evidences of wear, same being made substantially wholly of non-metallic and relatively inexpensive material, such as cardboard or wood or plastic or the like.

Another and important object of the invention is to provide a game device which combines several educational features directed to reading and spelling and has illustrations of animals, articles and the like and provides means for indicating individual letters which, when combined, spell names which identify specific of the animals, articles or the like which are illustrated.

For further comprehension of the invention and of the objects and advantages hereof, reference will be had to the following description and annexed drawing and to the appended claims in which the various novel features of the invention are more particularly set forth.

Figure 2:
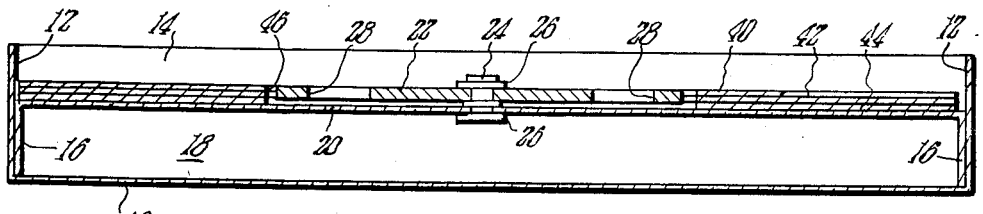

In the accompanying drawings forming a material part of this disclosure:

Fig. 1 illustrates in top plan a new favored embodiment of the device of the invention; and Fig. 2 is a sectional view on the line 2—2 of Fig. 1.

The embodiment selected to illustrate my invention include a support comprising, a base member 10 having vertical side and end walls 12 and 14 respectively extending upwardly therefrom in the well known manner so as to provide a tray like box construction.

Juxtaposed adjacent the inner faces of said walls 12 and 14 in a side by side manner are the side and end walls 16 and 18 respectively of a support member. Said support member includes a horizontally disposed planar surface 20 integrally fixed to the side and end walls 16 and 18 and spaced therebetween.

Centrally disposed relative to the uppermost surface of the member 20, a rotatable disc or dial member 22 is mounted thereon on a suitable pivot element 24 constituting a pin or the like which extends through the members 20 and 22 and is held relative thereto as by clips 26 or the like, in accordance with accepted practices in such art, all to the end that the disc member 22 may be rotated on and above the member 20 so as to bring an indicator element 27 printed or otherwise formed thereon into cooperative relationship with the other components as will hereinafter be observed.

The disc member 22 is provided with a plurality of circumferentially spaced finger holes or openings 28 extending therethrough and by means of which the disc may be rotated about the pivot 26.

Upon the upper surface of the member 20 groupments of letters of the alphabet such as shown at 30 are printed or otherwise formed in such circular arrangement as to be disposed and be as groupments visible through the correspondingly spaced finger openings 28 of the disc member in a manner similar to the relative arrangement of finger openings and groupments of letters as found on the current well known telephones of the dial type.

The disc member 22 may be rotated relative to the member 20 by the insertion of a finger into a finger opening 28 and moved in the familiar clockwise manner so as to bring the finger in the said finger opening to bear against the stop 32 which is disposed over a portion of the disc member at one side thereof and is supported upwardly from and secured to the member 20.

A plurality of sets of cards or leaves 40, 42 and 44 are arranged to be positioned within the support and upon the upper face of the planar surface 20 having central openings 46 therethrough to facilitate the positioning of said cards or leaves concentric to the disc 22 for cooperation therewith.

The cards are preferably made of rectangular pieces of light cardboard so as to enable several thereof to be placed upon the member 20 at one time and thus be capable of being stored when not in use.

Conceivably the cards may be printed on opposite sides so as to make the maximum use thereof and thereby conserve materials.

Each of the cards or leaves 40, 42, 44, etc., of the set thereof are sectioned or marked off into divisions by lines 46' diverging radially outwardly from a point located at the pin 24 centrally of the structure so as to provide areas within which various indicia or pictorial representations may be depicted as by printing or other application. That is, the areas are radially arranged in a circle concentric with the center of the disc and they are equally spaced by means of spaced radial calibrations. The series of illustrations and/or the names are of any objects which are readily perceptible and understandable by the youthful mind. When desired, other objects may be illustrated. The objects may be of a suitable classification or the depiction may be of heterogeneous objects as desired.

The divisions on the cards are of an extent commensurate with the center-to-center equal spacing of the finger holes so that the finger holes will register with the areas on the cards.

Each of the cards or leaves 40, 42, 44, etc., of the set thereof are provided within each of said areas with a name of an object, food item, animal or the like or a pictorial representation of the same which may be printed or otherwise applied thereto. In Fig. 1, is shown the employment of names such as "orange," "feather," "jug," and the like. It will be understood however that pictorial representations of an orange, feather, jug and the like could be substituted therefor.

With the foregoing description, the use and operation of the device will now be set forth.

In operation, the user turns the indicator dial to a position where the indicating element 27 is disposed directly beneath the stop 32. This serves as a starting point.

With the card such as 40 in use, one of the objects thereon such as the key as by the spelling of the name and/or the representation of the object, is selected.

The name is then spelled by placing a finger in the finger hole registering with the letter "k" and rotating the dial by bringing the finger down in the rotational direction of the arrow a until it abuts the stop 32. As a result, the disc has been fractionally moved.

The finger is then removed and placed in the finger hole now registering with the letter "e" and the plate is again rotated in the same direction until the finger again comes to rest against the stop. Again the disc has been fractionally moved.

In similar manner the finger hole registering with the "y" letter is brought around until the finger is again stopped by the stop. Again the disc has been fractionally moved.

If the spelling of "key" has been done properly, that is, if the word has been spelled properly by thus "dialing" the disc, the indicating element will have moved to a position adjacent the area containing the word "key" or the representation thereof. By a reading of such indication, the user is assured that he has spelled the word "key" correctly. On the other hand, if the element 27 does not so indicate, then the operator will know he has made a mistake in the selection of the proper letters in the name of the object. In other words, proper dialing of the actual letters in a word will always result in the bringing of the element 27 to the picture or name corresponding to that word and thereby "check" the manual operation.

Similarly all of the other names on the chart 40 may be spelled.

The same method of procedure may be carried out in executing exercises in arithmetic.

What is claimed is:

1. A spelling game device comprising, a support, a dialing disc rotatable on said support and having a plurality of circumferentially spaced finger openings therein, a plurality of groupments of letters circumferentially arranged on said support and visible through the correspondingly arranged circumferentially spaced finger openings in said disc disposed thereabove, a finger stop secured to said support and overlying a circumferential portion of said disc, an indicating element carried by said disc, a card on said support disposed around said disc having relatively spaced words comprising some of the letters of said groupments thereof, the letters of said groupments thereof and the words of said card being relatively arranged so that with said indicating element in register with said finger stop the letters of a selected word may be dialed successively to said stop to spell said word and on completion of the spelling said indicating element will point to the preselected word.

2. An educational wheel device comprising, a base, a rotatable member pivotally mounted on said base and having a plurality of circumferentially spaced finger openings therethrough, said base having depictions of letters circumferentially arranged in spaced relation and visible through the spaced finger openings of said rotatable member, a card member having an aperture therethrough, said card member being disposable on said base with said rotatable member thereof being receivable through the aperture thereof, said card member having thereon depictions of objects circumferentially arranged in spaced relation relative to the aperture thereof, indicating means carried by said rotatable member, means for stopping the rotation of said rotatable member through a certain angular movement to bring about registry of said indicating means with the depiction on said card member with the angular movement corresponding to the spelling of the name of the object whose depiction is selected.

3. In a device of the character described, the combination of, a base, a rotatable member pivotally mounted on said base and having a plurality of circumferentially spaced finger openings therethrough, said base having thereon depictions of letters of the alphabet circumferentially arranged in spaced relation and visible through the spaced finger openings of said rotatable member, a card member having a central aperture therethrough and being placeable on said base with said rotatable member being receivable through the central aperture, said card member having thereon selectable depictions of objects circumferentially arranged around the central aperture thereof, indicating means carried by said rotatable member, a finger stop extending from said base at the periphery of said rotatable member in a direction toward the pivotal mounting thereof for stopping the rotation of said rotatable member as said rotatable member is rotated with said indicating means at said finger stop as a predetermined starting point through a certain angular movement representative of the total of the steps resulting from movement of said rotatable member by bringing successively to said finger stop, the finger openings corresponding to the letters in the name of the selected object depicted to bring about registry of said indicating means with the selected depiction on said card member.

References Cited in the file of this patent

UNITED STATES PATENTS

| | | |
|---|---|---|
| 1,500,196 | McKay | July 8, 1924 |
| 1,555,125 | Lange | Sept. 29, 1925 |
| 2,655,738 | Shapiro et al. | Oct. 20, 1953 |
| 2,805,069 | Bonari et al. | Sept. 3, 1957 |
| 2,831,691 | Vince | Apr. 22, 1958 |

FOREIGN PATENTS

| | | |
|---|---|---|
| 370,019 | Italy | Apr. 5, 1939 |